United States Patent [19]
Kramer

[11] Patent Number: 6,082,301
[45] Date of Patent: Jul. 4, 2000

[54] PET DISH SUPPORT APPARATUS

[76] Inventor: Carl L. Kramer, 112 E. Stonecastle Dr., Granite Shoals, Tex. 78654

[21] Appl. No.: 09/466,090

[22] Filed: Dec. 17, 1999

[51] Int. Cl.[7] .............................. A01K 1/10; A47B 91/14; F16M 11/26

[52] U.S. Cl. ....................... 119/61; 248/346.07; 248/172; 248/519

[58] Field of Search ........................... 119/61, 51.5, 69.5, 119/74, 72, 657; 47/67, 39, 40.5; 248/346.07, 172, 519, 157, 149, 177.1; 211/203

[56] References Cited

U.S. PATENT DOCUMENTS

| | | | |
|---|---|---|---|
| D. 102,332 | 12/1936 | Manenty | D6/513 |
| D. 243,145 | 1/1977 | Zipser | D6/513 |
| 989,613 | 4/1911 | Kutsche | 119/61 |
| 2,584,301 | 2/1952 | Sinclair | 119/61 |
| 2,904,291 | 9/1959 | Harbes et al. | 47/40.5 |
| 3,838,838 | 10/1974 | Seaman, Jr. | 47/40.5 |
| 4,399,772 | 8/1983 | Salinas | 119/51.5 |
| 4,541,597 | 9/1985 | Davanture | 248/167 |
| 4,658,759 | 4/1987 | Brown | 119/61 |
| 4,941,283 | 7/1990 | Armstrong | 47/67 |
| 5,165,365 | 11/1992 | Thompson | 119/61 |
| 5,407,168 | 4/1995 | Shultz | 248/526 |
| 5,850,797 | 12/1998 | Hunicke | 119/61 |
| 5,881,671 | 3/1999 | Riedl | 119/61 |
| 5,979,859 | 11/1999 | Vartanov et al. | 248/522 |

FOREIGN PATENT DOCUMENTS

| | | | |
|---|---|---|---|
| 3300770 | 7/1984 | Germany | 119/61 |
| 2188525 | 10/1987 | United Kingdom | 119/61 |
| 691418 | 10/1987 | United Kingdom | 119/61 |
| 2198928 | 6/1988 | United Kingdom | 119/61 |

*Primary Examiner*—Michael J. Carone
*Assistant Examiner*—Son T. Nguyen

[57] ABSTRACT

A pet dish support apparatus for preventing insects and other undesirable things from getting into the food dish. The pet dish support apparatus includes a base having four telescopic member securely connected end-to-end, each telescopic member includes a cylinder, a shaft slidably disposed in the cylinder, and a locking member threaded through a wall of the cyclinder and being engageable to the shaft, and further includes four elongate support members being securely connected to the base and extending upwardly therefrom and being connect to a swing support member from which two swing members are suspended. At the bottom ends of the swing members are C-clamps which are used to hold onto a dish or bowl for the pet.

13 Claims, 1 Drawing Sheet

PET DISH SUPPORT APPARATUS

BACKGROUND OF THE INVENTION

1. Field of the Invention

The present invention relates to a support to suspend a food dish for a pet and more particularly pertains to a new pet dish support apparatus for preventing insects and other undesirable things from getting into the food dish.

2. Description of the Prior Art

The use of a support to suspend a food dish for a pet is known in the prior art. More specifically, a support to suspend a food dish for a pet heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,205,629; U.S. Pat. No. 4,506,475; U.S. Pat. No. 4,007,711; U.S. Pat. No. 5,360,193; U.S. Pat. No. 4,084,779; and U.S. Pat. No. 38,004.

While these devices fulfill their respective, particular objectives and requirements, the aforementioned patents do not disclose a new pet dish support apparatus. The inventive device includes a base having four telescopic member securely connected end-to-end, each telescopic member includes a cylinder, a shaft slidably disposed in the cylinder, and a locking member threaded through a wall of the cylinder and being engageable to the shaft, and further includes four elongate support members being securely connected to the base and extending upwardly therefrom and being connect to a swing support member from which two swing members are suspended. At the bottom ends of the swing members are C-clamps which are used to hold onto a dish or bowl for the pet.

In these respects, the pet dish support apparatus according to the present invention substantially departs from the conventional concepts and designs of the prior art, and in so doing provides an apparatus primarily developed for the purpose of preventing insects and other undesirable things from getting into the food dish.

SUMMARY OF THE INVENTION

In view of the foregoing disadvantages inherent in the known types of a support to suspend a food dish for a pet now present in the prior art, the present invention provides a new pet dish support apparatus construction wherein the same can be utilized for preventing insects and other undesirable things from getting into the food dish.

The general purpose of the present invention, which will be described subsequently in greater detail, is to provide a new pet dish support apparatus which has many of the advantages of the support to suspend a food dish for a pet mentioned heretofore and many novel features that result in a new pet dish support apparatus which is not anticipated, rendered obvious, suggested, or even implied by any of the prior art a support to suspend a food dish for a pet, either alone or in any combination thereof.

To attain this, the present invention generally comprises a base having four telescopic member securely connected end-to-end, each telescopic member includes a cylinder, a shaft slidably disposed in the cylinder, and a locking member threaded through a wall of the cylinder and being engageable to the shaft, and further includes four elongate support members being securely connected to the base and extending upwardly therefrom and being connect to a swing support member from which two swing members are suspended. At the bottom ends of the swing members are C-clamps which are used to hold onto a dish or bowl for the pet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet dish support apparatus which has many of the advantages of the support to suspend a food dish for a pet mentioned heretofore and many novel features that result in a new pet dish support apparatus which is not anticipated, rendered obvious, suggested, or even implied by any of the prior art a support to suspend a food dish for a pet, either alone or in any combination thereof.

It is another object of the present invention to provide a new pet dish support apparatus which may be easily and efficiently manufactured and marketed.

It is a further object of the present invention to provide a new pet dish support apparatus which is of a durable and reliable construction.

An even further object of the present invention is to provide a new pet dish support apparatus which is susceptible of a low cost of manufacture with regard to both materials and labor, and which accordingly is then susceptible of low prices of sale to the consuming public, thereby making such pet dish support apparatus economically available to the buying public.

Still yet another object of the present invention is to provide a new pet dish support apparatus which provides in the apparatuses and methods of the prior art some of the advantages thereof, while simultaneously overcoming some of the disadvantages normally associated therewith.

Still another object of the present invention is to provide a new pet dish support apparatus for preventing insects and other undesirable things from getting into the food dish.

Yet another object of the present invention is to provide a new pet dish support apparatus which includes a base having four telescopic member securely connected end-to-end, each telescopic member includes a cylinder, a shaft slidably disposed in the cylinder, and a locking member threaded through a wall of the cyclinder and being engageable to the shaft, and further includes four elongate support members being securely connected to the base and extending upwardly therefrom and being connect to a swing support member from which two swing members are suspended. At the bottom ends of the swing members are C-clamps which are used to hold onto a dish or bowl for the pet.

Still yet another object of the present invention is to provide a new pet dish support apparatus that substantially helps keep the dish or bowl clean for the pet Even still another object of the present invention is to provide a new pet dish support apparatus that can be easily adjusted to many different heights depending upon the size of the pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
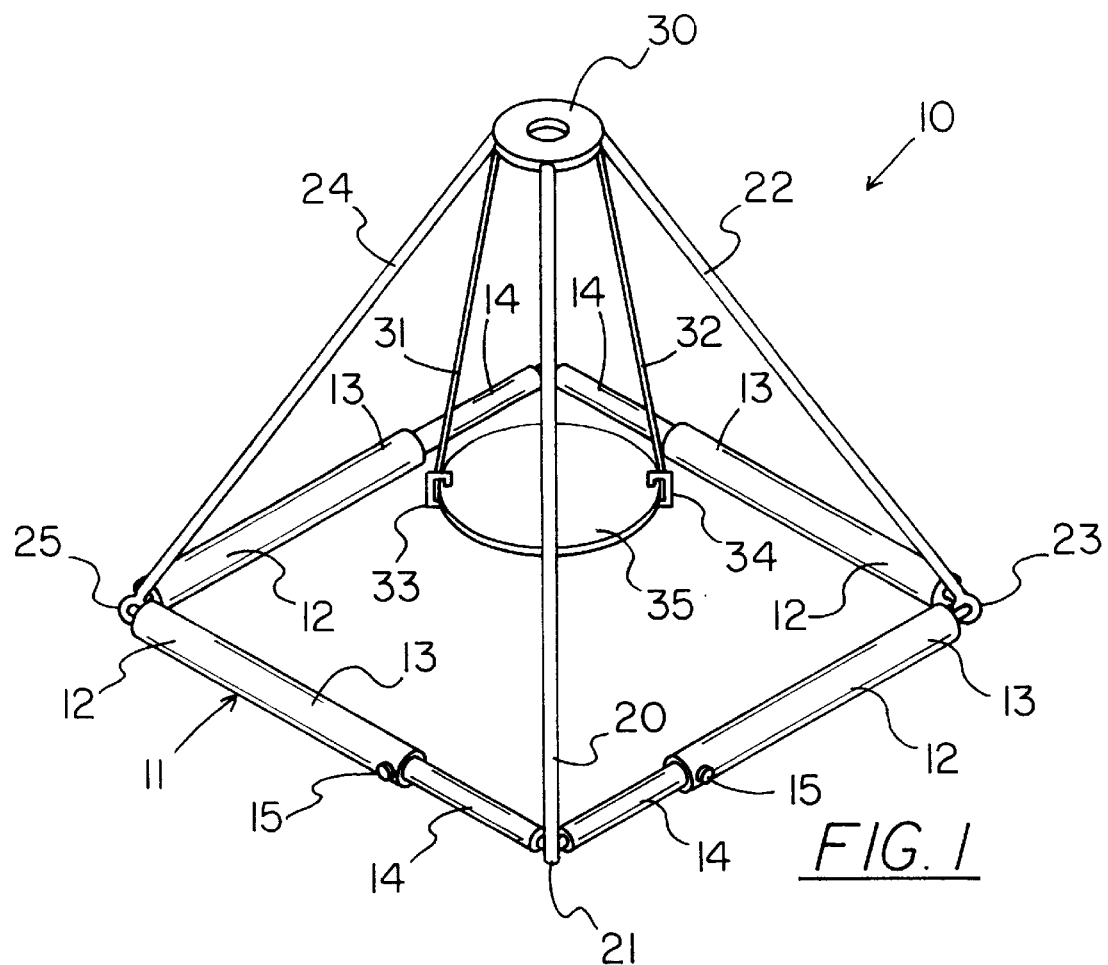
FIG. 1 is a perspective view of a new pet dish support apparatus according to the present invention.
Figure 2:
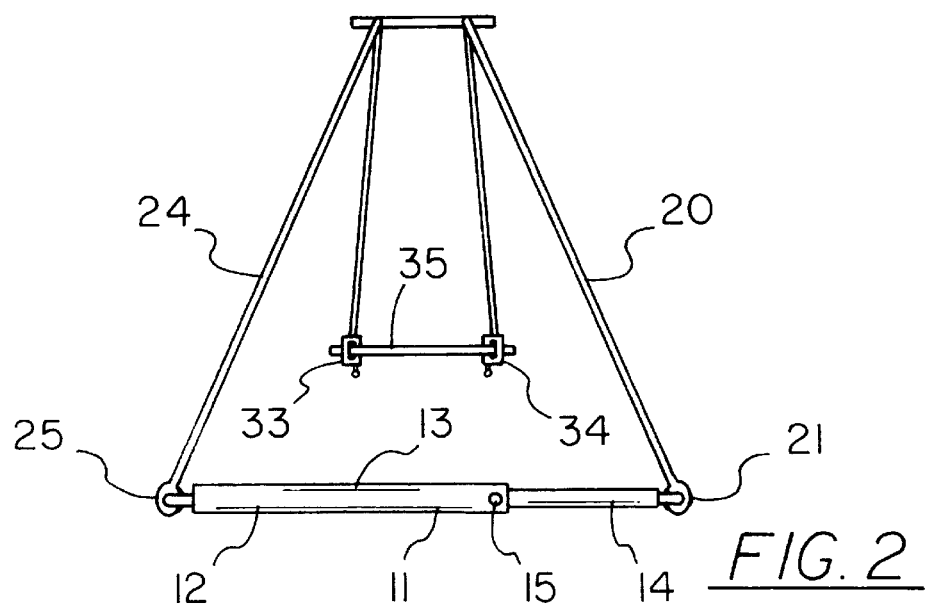
FIG. 2 is a side elevational view of the present invention.

With reference now to the drawings, and in particular to FIGS. 1 through 2 thereof, a new pet dish support apparatus embodying the principles and concepts of the present invention and generally designated by the reference numeral 10 will be described.

As best illustrated in FIGS. 1 through 2, the pet dish support apparatus 10 generally comprises a base 11 including a plurality of telescopic members 12 conventionally connected end-to-end. Each of the telescopic members 12 includes a cylinder 13 having an open first end, a shaft 14 slidable and adjustably disposed in the cylinder 13 through the open first end, and a locking member 15 threaded through a wall of the cylinder 13 and engageable with the shaft 14 for locking the shaft 14 at a selected extended position. The telescopic members 12 are arranged to form a size-adjustable square structure. Pairs of the telescopic members 12 are securely and conventionally joined at second ends of the cylinders 13. Further, pairs of the telescopic members 12 are also securely joined at first ends of the shafts 14. The pet dish support apparatus 10 also includes a plurality of elongate support members 20,22,24 having first ends connected to the base 11 and extending upwardly therefrom, each of the elongate support members 20,22,24 having an eyelet 21,23,25 disposed at the first end and is conventionally connected to where a respective pairs of the telescopic members 12 are joined. A swing support member 30 is securely and conventionally connected to second ends of the elongate support members 20,22,24. The swing support member 30 is height-adjustably suspended above the base 11 and is essentially a disk. The pet dish support apparatus 10 further includes a plurality of swing members 31,32 each having a first end conventionally connected to the swing support member 30. The swing members 31,32 are height-adjustably suspended from the swing support member 30. In addition, the pet dish support apparatus 10 includes a plurality of fastening members 33,34 each being removably connected to a second end of a respective one of the swing members 31,32. The fastening members 33,34 are adapted to support a dish 34 for a pet above a ground surface and are essentially C-clamps.

As a first embodiment, the swing members 31,32 are essentially chains, and as a second embodiment, the swing members 31,32 are essentially rods.

In use, the user fastens a dish or bowl 35 for the pet to the C-clamps 33,34 such that the dish or bowl 35 is suspended above a ground surface. The swing support member 30 can be raised anywhere from 12 inches to 18 inches from the ground surface by the user adjusting the positioning of the shafts 14 relative to the cylinders 13. By suspending the dish or bowl 35 above the ground surface, the user essentially prevents bugs and dirt from getting into the dish or bowl 35.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet dish support apparatus comprising:
    a base including a plurality of telescopic members connected end-to-end;
    a plurality of elongate support members having first ends connected to said base and extending upwardly therefrom;
    a swing support member securely connected to second ends of said elongate support members, said swing support member being suspended above said base;
    a plurality of swing members each having a first end connected to said swing support member, said swing members being height-adjustably suspended from said swing support member; and
    a plurality of fastening members each being connected to a second end of a respective one of said swing members.

2. A pet dish support apparatus as described in claim 1, wherein each of said telescopic members includes a cylinder having an open first end, a shaft slidable and adjustable in said cylinder through said open first end, and a locking member threaded through a wall of said cylinder and engageable with said shaft for locking said shaft at a selected extended position.

3. A pet dish support apparatus as described in claim 2, wherein said telescopic members are arranged to form a size-adjustable square structure.

4. A pet dish support apparatus as described in claim 3, wherein pairs of said telescopic members are securely joined at second ends of said cylinders, further pairs of said telescopic members being securely joined at first ends of said shafts.

5. A pet dish support apparatus as described in claim 4, wherein each of said elongate support members has an eyelet disposed at said first end, and is connected to where a respective said pairs of said telescopic members are joined.

6. A pet dish support apparatus as described in claim 5, wherein said swing support member is essentially a disk.

7. A pet dish support apparatus as described in claim 5, wherein said swing members are essentially chains.

8. A pet dish support apparatus as described in claim 5, wherein said swing members are rods.

9. A pet dish support apparatus as described in claim 5, wherein said fastening members are adapted to support a dish for a pet above a ground surface.

10. A pet dish support apparatus as described in claim 9, wherein said fastening members are essentially C-clamps.

11. A pet dish support apparatus comprising:

a base including a plurality of telescopic members connected end-to-end, each of said telescopic members including a cylinder having an open first end, a shaft slidable and adjustably disposed in said cylinder through said open first end, and a locking member threaded through a wall of said cylinder and engageable with said shaft for locking said shaft at a selected extended position, said telescopic members being arranged to form a size-adjustable square structure, pairs of said telescopic members being securely joined at second ends of said cylinders, further pairs of said telescopic members also being securely joined at first ends of said shafts;

a plurality of elongate support members having first ends connected to said base and extending upwardly therefrom, each of said elongate support members having an eyelet disposed at said first end and being connected to where a respective said pairs of said telescopic members are joined;

a swing support member securely connected to second ends of said elongate support members, said swing support member being suspended above said base, said swing support member being essentially a disk, said swing support member being adjustable anywhere from 12 inches to 18 inches above a ground surface;

a plurality of swing members each having a first end connected to said swing support member, said swing members being height-adjustably suspended from said swing support member; and a plurality of fastening members each being connected to a second end of a respective one of said swing members, said fastening members being adapted to support a dish for a pet above a ground surface, said fastening members being essentially C-clamps.

12. A pet dish support apparatus as described in claim 11, wherein said swing members are essentially chains.

13. A pet dish support apparatus as described in claim 11, wherein said swing members being essentially rods.

* * * * *